US009747267B2

(12) United States Patent
Liu et al.

(10) Patent No.: US 9,747,267 B2
(45) Date of Patent: Aug. 29, 2017

(54) DOCUMENT EDITING SYNCHRONIZATION

(71) Applicant: Adobe Systems Incorporated, San Jose, CA (US)

(72) Inventors: Ying Liu, Beijing (CN); Yongchao Zhang, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 361 days.

(21) Appl. No.: 13/964,867

(22) Filed: Aug. 12, 2013

(65) Prior Publication Data

US 2015/0046801 A1     Feb. 12, 2015

(51) Int. Cl.
| G06F 17/00 | (2006.01) |
| G06F 17/24 | (2006.01) |
| G06F 17/21 | (2006.01) |
| G06F 17/30 | (2006.01) |
| G06F 17/22 | (2006.01) |
| G06F 3/0488 | (2013.01) |
| G06F 9/45 | (2006.01) |

(52) U.S. Cl.
CPC ............ G06F 17/24 (2013.01); G06F 17/241 (2013.01); *G06F 3/04883* (2013.01); *G06F 8/48* (2013.01); *G06F 17/211* (2013.01); *G06F 17/212* (2013.01); *G06F 17/2247* (2013.01); *G06F 17/2288* (2013.01); *G06F 17/30174* (2013.01)

(58) Field of Classification Search
CPC .... G06F 17/24; G06F 17/30174; G06F 8/458; G06F 11/2076; G06F 11/2082; G06F 3/04883; G06F 17/2247; G06F 17/241; G06F 17/212; G06F 17/211; G06F 17/2288; G06F 8/48

USPC ................................ 715/255, 203, 273, 732
See application file for complete search history.

(56) References Cited

U.S. PATENT DOCUMENTS

| 5,146,552 | A | | 9/1992 | Cassoria et al. |
| 5,347,629 | A | | 9/1994 | Barrett et al. |
| 5,349,368 | A | * | 9/1994 | Takeda ................ G06F 17/2872 345/641 |
| 8,214,822 | B2 | | 7/2012 | Gough et al. |
| 2004/0167768 | A1 | * | 8/2004 | Travieso et al. .................. 704/2 |
| 2008/0072164 | A1 | | 3/2008 | Park |
| 2009/0125518 | A1 | * | 5/2009 | Bailor et al. ...................... 707/8 |
| 2009/0249224 | A1 | * | 10/2009 | Davis et al. ................... 715/753 |
| 2012/0110445 | A1 | * | 5/2012 | Greenspan et al. .......... 715/256 |
| 2013/0246901 | A1 | * | 9/2013 | Massand ................ G06F 17/24 715/229 |
| 2014/0163950 | A1 | * | 6/2014 | Liu ....................... G06F 17/289 704/3 |

(Continued)

FOREIGN PATENT DOCUMENTS

WO      WO-9303473      2/1993

*Primary Examiner* — Quoc A Tran
(74) *Attorney, Agent, or Firm* — Wolfe-SBMC

(57) ABSTRACT

Document editing synchronization techniques are described. In one or more implementations, one or more inputs are received via a user interface to edit a first portion of a first document, the first portion of the first document corresponding to a first portion of a second document. Responsive to receipt of an input to begin editing of a second portion of the first document, correspondence in the user interface of the second portion of the first document is indicated to a second portion of the second document automatically and without user intervention.

20 Claims, 9 Drawing Sheets

(56) References Cited

U.S. PATENT DOCUMENTS

2014/0164315 A1* 6/2014 Golshan ........................ 707/608

* cited by examiner

DOCUMENT EDITING SYNCHRONIZATION

BACKGROUND

A wide variety of documents may be edited by a user, which may include composing a document "from scratch" as well as editing a preexisting document. For example, a user may edit a document using a word processor, spreadsheet program, presentation program, drawing program, and so on. In some instances, the editing of documents may relate to each other. For example, a user may edit a first document to compose a translation of a second document, provide comments in a first document regarding the second document, and so on.

However, conventional techniques that were utilized to support editing separately addressed each of the documents. Therefore, these conventional techniques could require manual interaction on the part of a user that could be time consuming as well as frustrating to determine and manage correspondence between the documents.

SUMMARY

Document editing synchronization techniques are described. In one or more implementations, one or more inputs are received via a user interface to edit a first portion of a first document, the first portion of the first document corresponding to a first portion of a second document. Responsive to receipt of an input to begin editing of a second portion of the first document, correspondence in the user interface of the second portion of the first document is indicated to a second portion of the second document automatically and without user intervention.

In one or more implementations, a first and second document are output in a user interface that is configured to support editing of at least the first document. A visual characteristic of one or more portions of the second document is changed automatically and without user intervention in the user interface that correspond to portions of the first document being edited by a user such that the changing follows navigation between the portions of the first document.

In one or more implementations, a system includes at least one module implemented at least partially in hardware. The at least one module is configured to perform operations that include outputting a user interface configured to support editing of a document to perform a translation and indicating correspondence of the editing of a portion of the document to a portion being translated automatically and without user intervention.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

As previously described, conventional applications may support editing of a wide variety of applications. However, these conventional applications were limited in addressing synchronization between the editing of multiple documents.

Document editing synchronization techniques are described herein. In one or more implementations, these techniques may be utilized to indicate correspondence between documents automatically and without user intervention. For example, these techniques may be utilized to indicate correspondence of paragraphs in multiple documents. This may be performed by indicating a portion of a second document through use of a visual characteristic (e.g., highlighting a paragraph to give that paragraph focus in a user interface) that corresponds to text or other inputs being entered into a first document. When a carriage return or other input indicates a new portion is received, a next subsequent paragraph of the second document may be given focus. In this way, the user interface may follow "what the user is working on" automatically and without user intervention.

Further, this correspondence may be saved such that as the user navigates back through the first document (e.g., the comments, translation, and so on) corresponding portions of the second document are indicated automatically and without user intervention, e.g., by highlighting corresponding paragraphs, images, cells in a spreadsheet, and so on. In this way, correspondence between the documents may be traced automatically and without user intervention, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
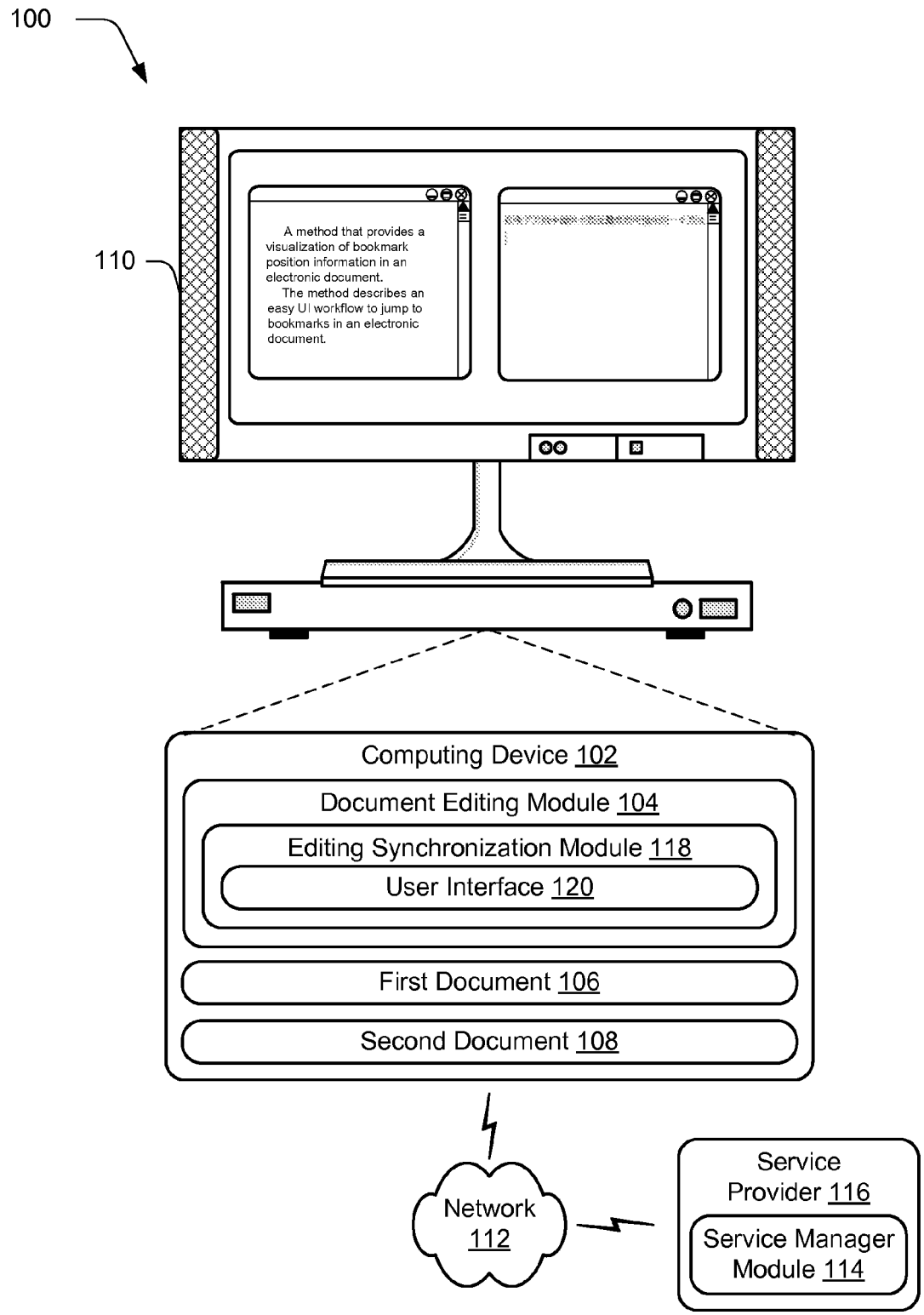
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, which may be configured in a variety of ways. The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The computing device 102 is illustrated as including a document editing module 104. The document editing module 104 is representative of functionality to edit documents, such as a first and second documents 106, 108 that may be stored in memory of the computing device 102 and displayed on the display device 110. A variety of different types of documents may be edited by the document editing module 104, such as word processing documents, spreadsheets, notes, presentations (e.g., documents having a slideshow), drawings, images, sound files, and so on that are editable by a user.

Additionally, functionality of the document editing module 104 may be implemented in a variety of ways. For example, the functionality may be implemented as a standalone application, as part of functionality of the computing device 102 (e.g., an operating system), made available via a network 112 from a service manager module 114 of a service provider 116 (e.g., a web service), and so on. As such, the functionality may be made available locally at the computing device 102, remotely via the service provider 116, distributed between devices, and so on.

The document editing module 104 is also illustrated as including an editing synchronization module 118. The editing synchronization module 118 is representative of functionality to synchronize editing of a plurality of documents, such as the first and second documents 106, 108 to each other although other numbers of documents may also be synchronized, such as three, four, five, and so on.

Operation of the editing synchronization module 118, for instance, may be initiated through receipt of an input, e.g., selection of an option in a user interface 120 displayed by a display device 110, command, gesture, and so on. In response, the editing synchronization module 118 may synchronize editing of portions of a first document 106 with corresponding portions of a second document 108, and vice versa. An example of such synchronization is described as follows and shown in a corresponding figure.

Figure 2:
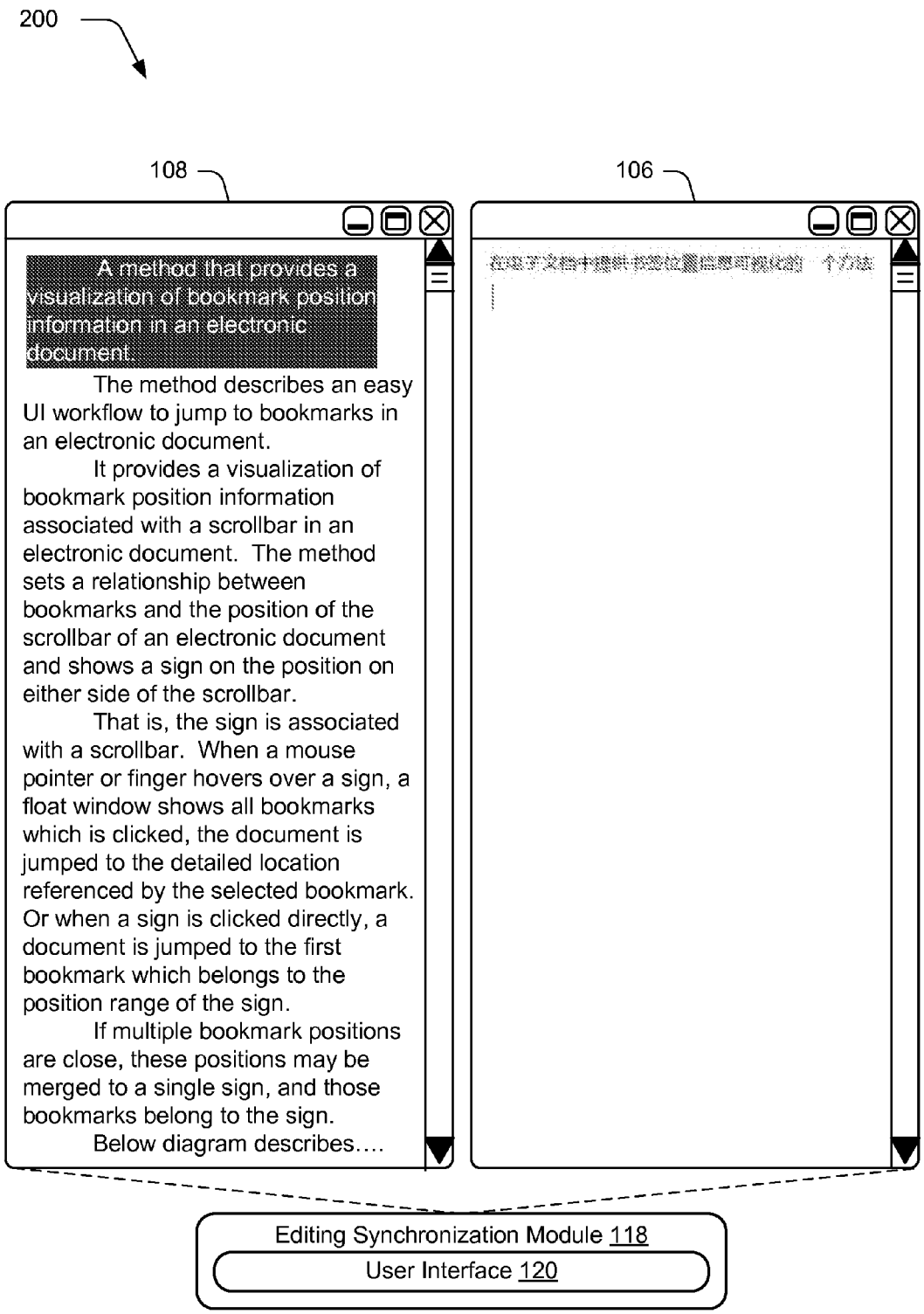
FIG. 2 depicts a system in an example implementation in which a user interface is used to display first and second documents to support a editing synchronization mode supported by an editing synchronization module of FIG. 1.

FIG. 2 depicts a system 200 in an example implementation in which a user interface is used to display the first and second documents 106, 108 to support a editing synchronization mode supported by the editing synchronization module 118 of FIG. 1. In general, conventional document editing software does not offer cognitive aids to help the user trying to mark the conjunction of corresponding portions of two different documents. For example, to translate or comment on a document, a new document may be written that includes the translation, comments, and so on. In order to do so, conventional techniques involved manual switching between the documents to locate the corresponding portions, which be tedious and inefficient. However, the techniques described herein may be utilized to automatically synchronize editing of a document with corresponding portions in one or more other documents, e.g., paragraphs, cells, images, drawings, and so on. In this way, a user may efficiently navigate through a document to make edits and also locate corresponding portions automatically and without user intervention, which may follow "what you see is what you get "WYSIWYG" techniques.

As illustrated in FIG. 2, for instance, a user interface including a simultaneous display of first and second documents 106, 108 is shown. In this example, English text of the second document 108 is being translated into Chinese text in the first document 106. Thus, the first document 106 receives edits to compose a Chinese version of the English document. The user interface may be output responsive to a variety of different inputs, such as selection of an item in a menu, a gesture, command, and so on which causes the editing synchronization module 118 to output the user interface 120.

Synchronization between portions of the first and second documents 106, 108 may then be tracked automatically and without user intervention by the editing synchronization module 118. The editing synchronization module 118, for instance, may automatically synchronize paragraphs of the first and second documents 106, 108. In the illustrated instance, a user enters Chinese text as part of editing of a first document 106, with a corresponding portion of the second document being distinguished from other parts of the second document 108 by altering one or more visual characteristics of the portion. As shown, this involves a focus given through reversing a display of a text and background although other examples are also contemplated, such as underlining, bolding, changing colors, opacity, and so on.

Figure 3:
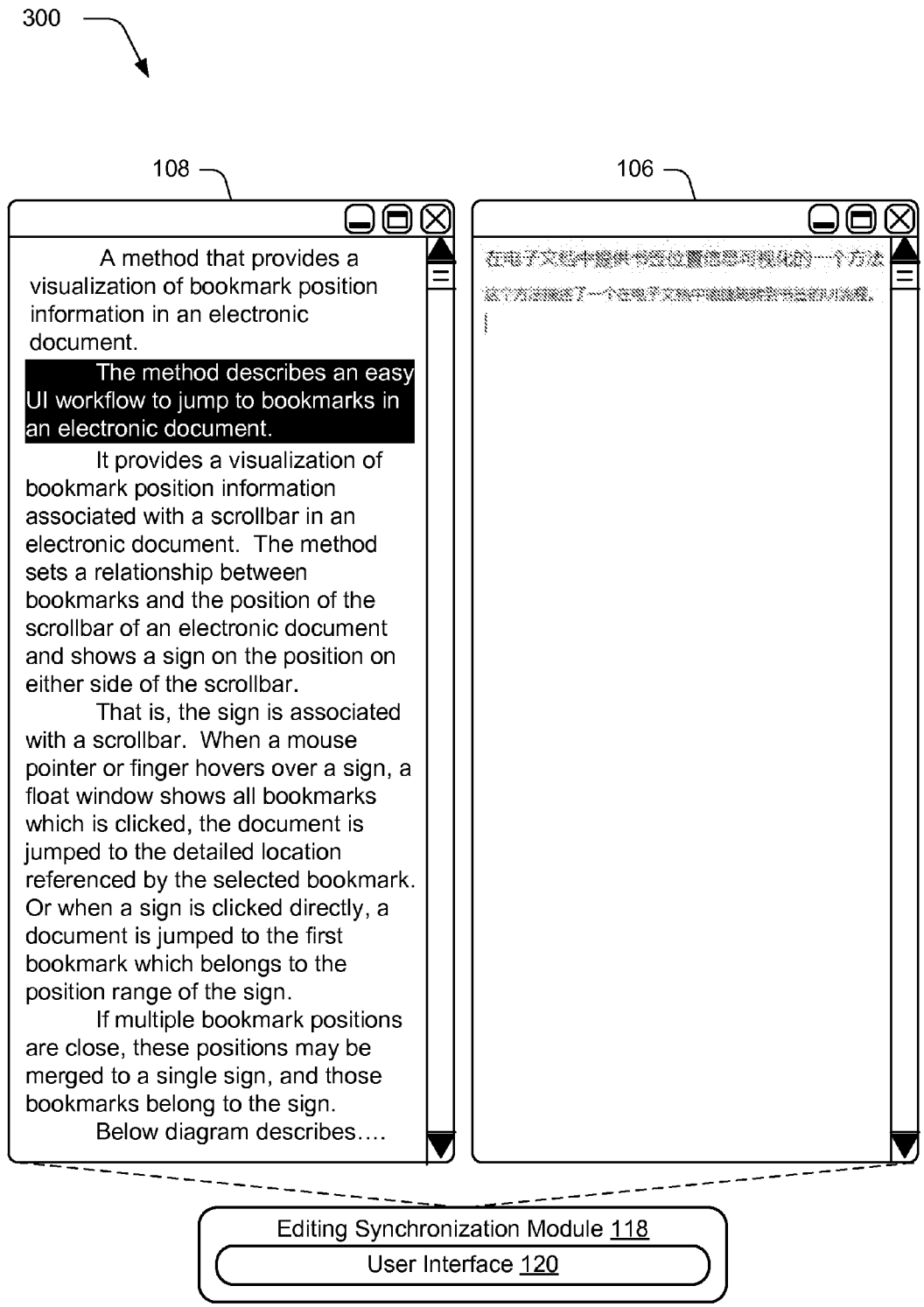
FIG. 3 depicts a system in an example implementation in which a user interface is used to display a next corresponding paragraph of the second document as highlighted.

When a user enters a carriage return character in document 106, the editing synchronization module 118 may recognize this input as ending translation of a paragraph. Accordingly, a next corresponding paragraph of the second document 108 would be highlighted as shown in the example 300 in FIG. 3. Thus, this may be used to indicate a counterpart of the paragraph being edited. In other words, that a current text entry portion of the first document 106 is to be synchronized with the indicated portion of the second document 108. By default, the conjunction between the two paragraphs in the original and new documents may then be set up automatically and without user intervention by the editing synchronization module 118.

When the translation for the indicated paragraph of the second document 108 is finished in the first document 106, the indication of correspondence is jumped to the next sequential paragraph. Thus, in these examples sequential carriage returns or other indications of an end of a section (e.g., cell, slide, and so on) in the editing of the first document 106 may cause the indication to follow this navigation through corresponding portions of the second document 108. The synchronization may also be indicated manually by a user (e.g., through use of a cursor control device, gesture, voice command, and so on), such as when "skipping" between portions of the first document 106 that correspond to portions of the second document.

Figure 4:
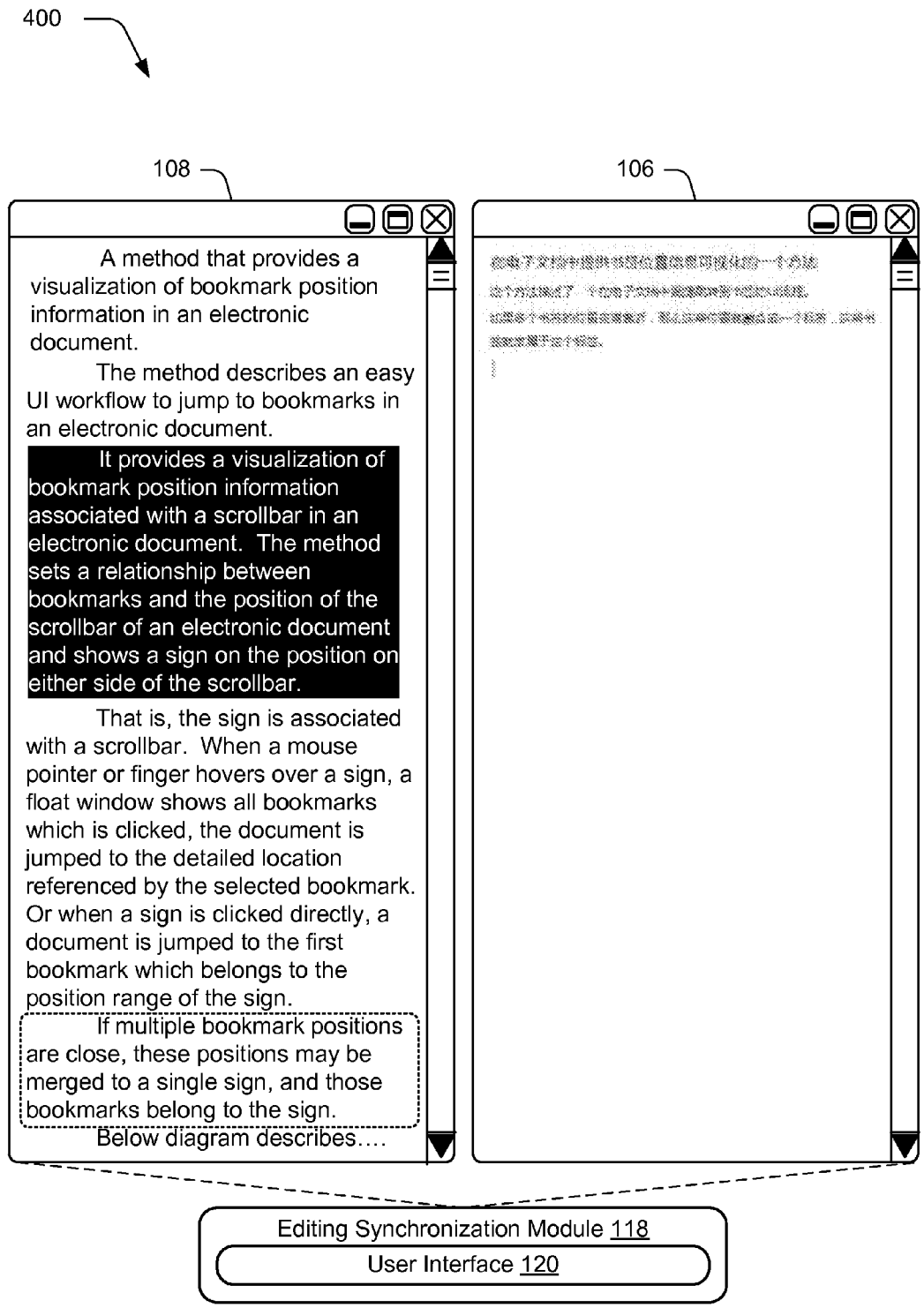
FIG. 4 depicts an example of the first and second documents of FIG. 1 in which editing of the first document skips corresponding portions of the second document.

FIG. 4 depicts an example 400 of the first and second documents 106, 108 in which editing of the first document 106 skips corresponding portions of the second document 108. A user, in this example may skip two paragraphs as described in relation to FIG. 3 to begin translation of a fifth paragraph of the second document 108.

Figure 5:
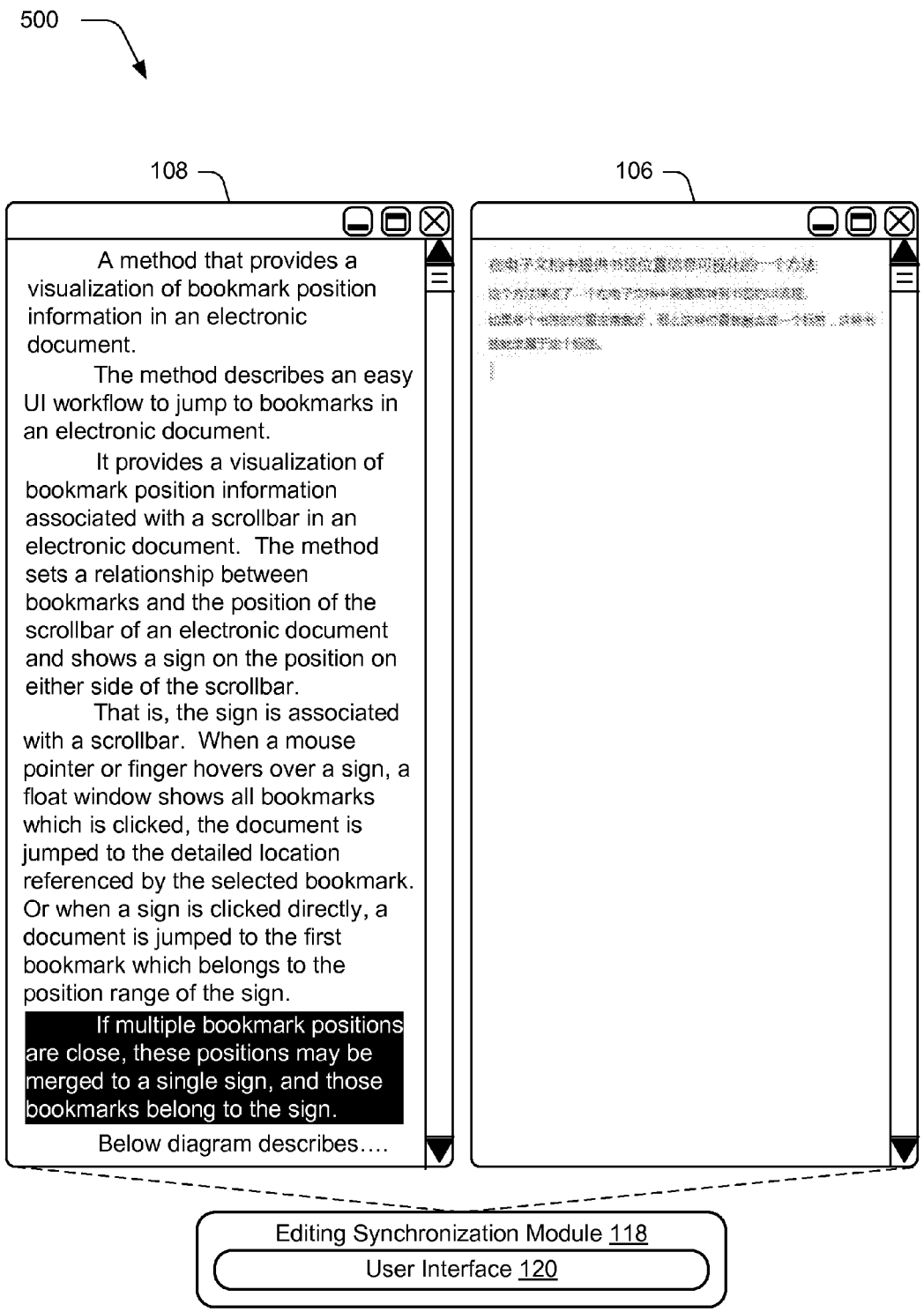
FIG. 5 depicts an example of the first and second documents of FIG. 1 showing navigation back to a previous paragraph after the editing shown in FIG. 4.

As translated, however, the indication may remain on the third paragraph, but this paragraph was skipped and instead the paragraph within the box shown in phantom in FIG. 4 is being translated. In such an instance, a user may keep a text entry indication of the first document 106 "as is" and then select which portion of the second document 108 corresponds to that first document, such as through use of a cursor control device, gesture, voice command, and so on. A result of this selection is shown in the example 500 of FIG. 5.

Figure 6:
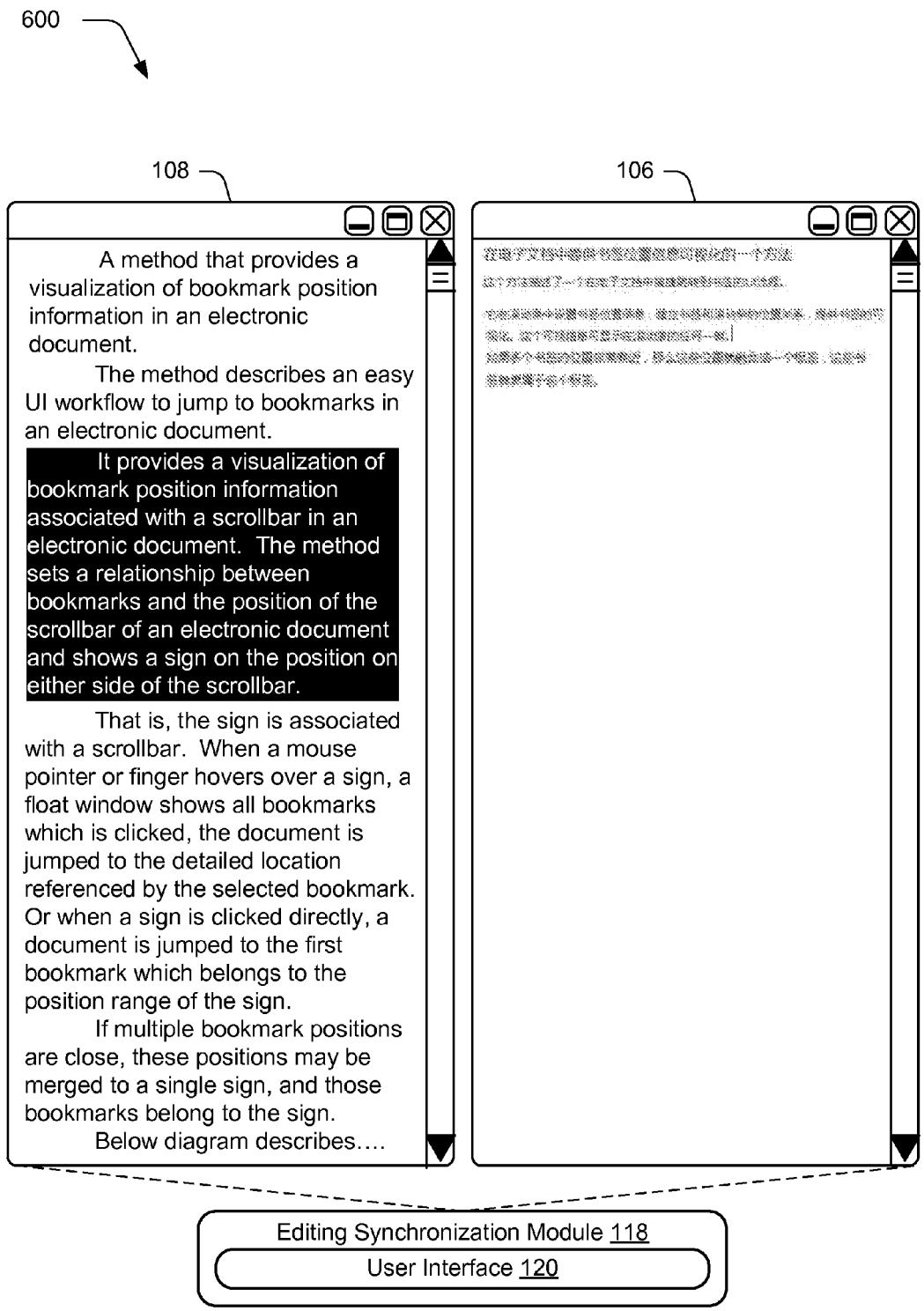
FIG. 6 depicts an example of the first and second documents of FIG. 1 in which correspondence is indicated through highlighting in the second document and positioning of a cursor in the first document.

The editing synchronization module 118 may also be utilized to follow navigation through either of the documents to indicate correspondence. Continuing with the previous example, suppose a user wishes to navigate back to a previous paragraph after the editing shown in FIG. 5. A user may select that paragraph as displayed in either the first or second documents 106, 108, which may then cause the correspondence to be indicated through highlighting of the paragraph in the second document 108 and positioning of a text entry indication in the first document 106 as illustrated in the example 600 of FIG. 6. Thus, the editing synchronization module 118 may show synchronization between the first and second documents 106, 108 to follow navigation through either document.

Synchronization of the documents may be maintained automatically through use of the editing synchronization module 118. For example, metadata may be stored as part of the respective documents, separately from the documents, and so on. Therefore, once saved the first and second documents 106, 108 may be considered peer-to-peer for purposes of the eliding synchronization module 118 such that opening and selection of the option for "Synchronous Editing" may cause the corresponding document to be opened automatically and without user intervention. Further, corresponding portions of where a user "left off editing" may be indicated as shown in the example 700 of FIG. 7.

Figure 7:
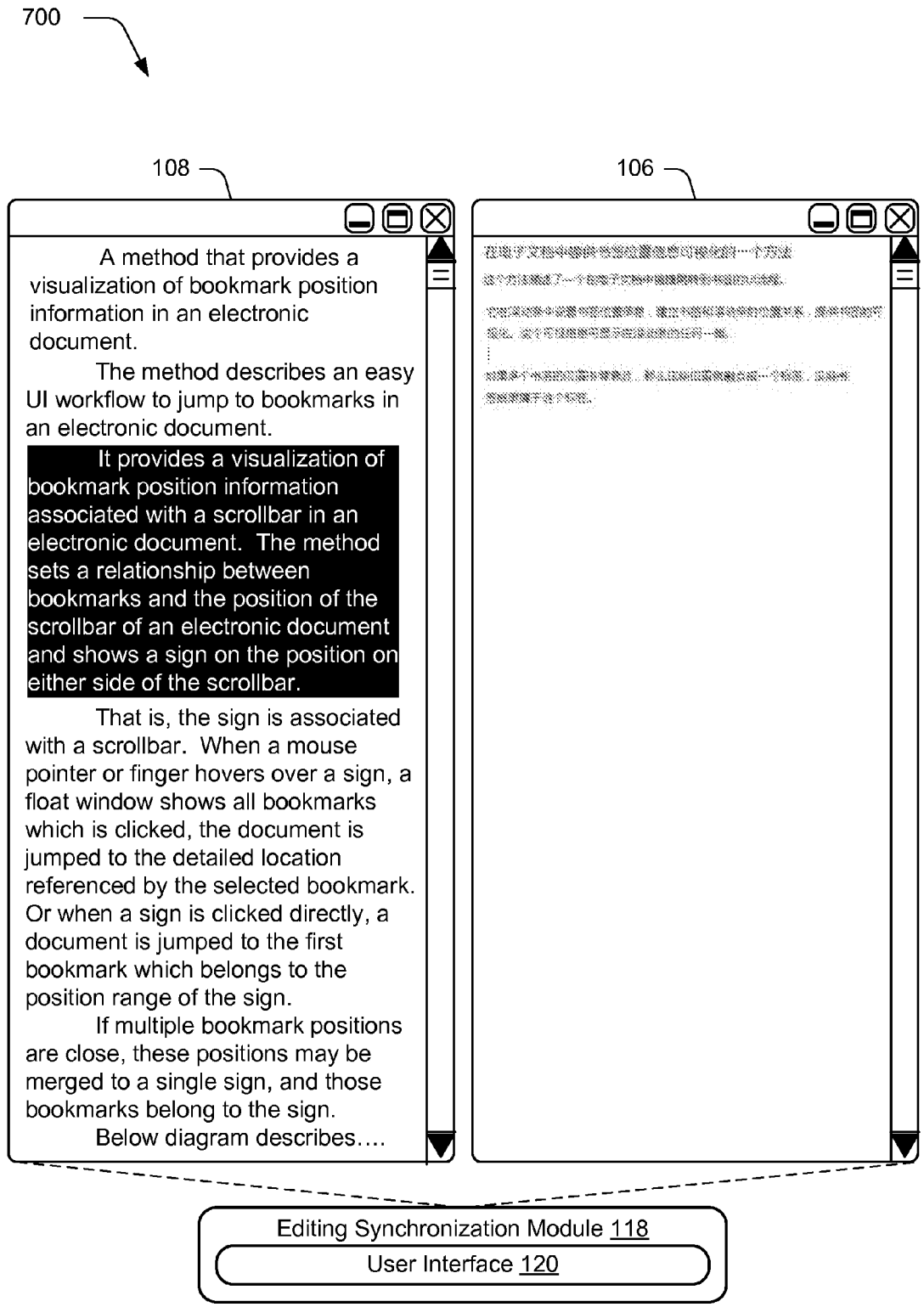
FIG. 7 depicts an example of the first and second documents of FIG. 1 in which select of a portion of the first document by a user causes a corresponding portion of the second document to be indicated.

For example, as shown in FIG. 7 a user may select a third paragraph of the first document 106 which causes a corresponding portion of the second document 108 to be indicated as illustrated. A user may then continue to edit either one of the first and second documents 106, 108 as before with the synchronizations (e.g., conjunctions) of the portions of the documents maintained by the editing synchronization module 118 as before.

Thus, as described in the example of FIGS. 2-7, the editing synchronization module 118 may be used to automatically maintain correspondence between paragraphs and other portions of documents. For example, the editing synchronization module 118 may be used to calculate an index of portions (e.g., paragraphs) for an original document, such as the second document 108.

When editing a new document (e.g., the first document 106), corresponding index information of the original document may be inserted into the end for each new paragraph which may or may not be viewable to a user. At the same time, index information of the new document (e.g., the first document 106) may be inserted into corresponding portions of the original document, e.g., the second document 108, such as in response to a carriage return or other input. Thus, the conjunctions and synchronization of the two portions may be maintained in both documents.

When navigating through either of the documents, such as by "clicking" a paragraph, the editing synchronization module 118 may obtain index information from its peer to locate the corresponding portion. Thus, sequential navigation as well as navigation that "skips around" between sections may be supported by the editing synchronization module 118. Further discussion of these and other techniques may be found in relation to the following procedures.

Example Procedures

The following discussion describes document editing synchronization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
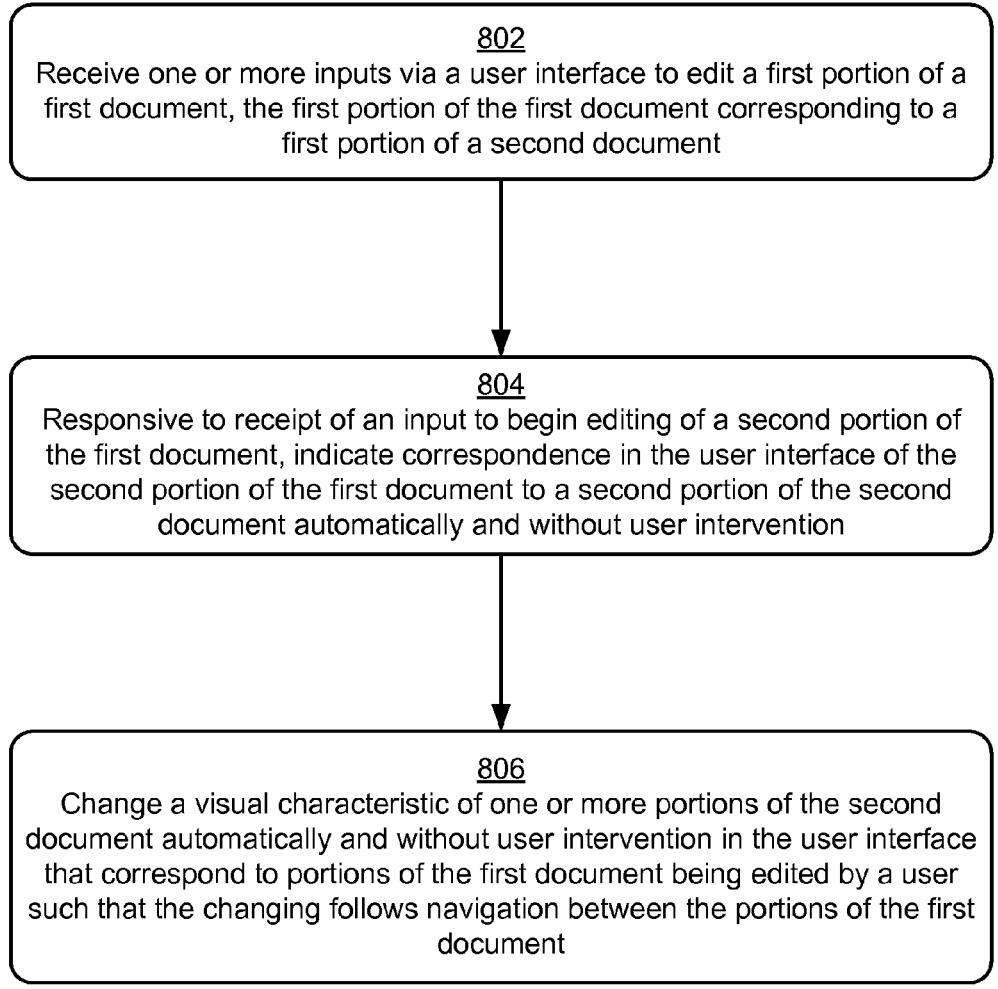
FIG. 8 is a flow diagram depicting a procedure in an example implementation in which document editing is synchronized between a plurality of documents to indicate correspondence of portions of the documents.

FIG. 8 depicts a procedure 800 in an example implementation in which document editing is synchronized between a plurality of documents to indicate correspondence of portions of the documents. One or more inputs are received via a user interface to edit a first portion of a first document, the first portion of the first document corresponding to a first portion of a second document (block 802). As shown in the example 200 of FIG. 2, for instance, a user edits a first portion of a first document 106 that corresponds to a first portion of a second document 108.

Responsive to receipt of an input to begin editing of a second portion of the first document, correspondence in the user interface of the second portion of the first document is indicated to a second portion of the second document automatically and without user intervention (block 804). Continuing with the previous example, correspondence between the two is indicated using a text entry indication in the first document 106 and changing of visual characteristics of the portion of the second document 108.

A visual characteristic of one or more portions of the second document is changed automatically and without user intervention in the user interface that correspond to portions of the first document being edited by a user such that the changing follows navigation between the portions of the first document (block 806). As shown in FIGS. 2-7, indications of correspondence in the second document 108 may follow navigation performed in the first document 106. The reverse is also true as previously described.

Example System and Device

Figure 9:
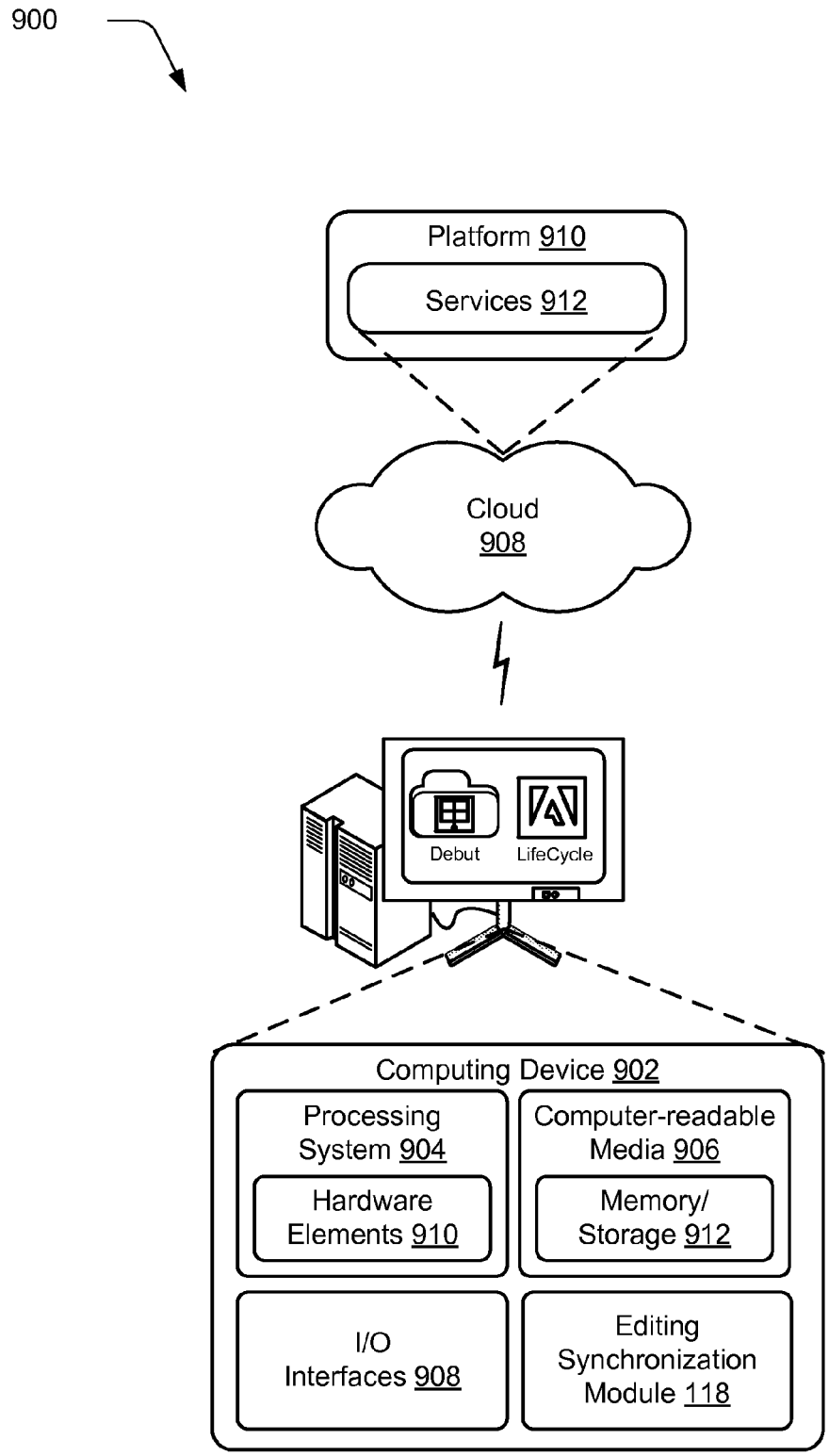
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the editing synchronization module 118, which may be configured to synchronize editing of data between a plurality of documents. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for synchronized editing of simultaneously displayed first and second documents in a user interface, a method implemented by one or more computing devices comprising:

opening and displaying the first document and the second document simultaneously in the user interface;

receiving at least one input via the user interface to edit a first portion of the first document, the first portion of the first document corresponding to a first portion of the second document;

subsequent to receiving the at least one input to edit the first portion of the first document, receiving at least one input via the user interface to begin editing of a second portion of the first document;

responsive to receiving the at least one input to begin editing of the second portion of the first document, indicating correspondence in the user interface of the second portion of the first document to a second portion of the second document and synchronizing the second portion of the first document and the second portion of the second document, the second portion of the second document comprising a next sequential portion of the second document relative to the first portion of the second document, the indicating and synchronizing occurring automatically and without user intervention.

2. A method as described in claim 1, wherein the receiving includes indicating correspondence in the user interface of the first portion of the first document to the first portion of the second document automatically and without user intervention during the editing of the first portion of the first document.

3. A method as described in claim 1, wherein the at least one input to begin editing of the second portion of the first document is recognized as a carriage return.

4. A method as described in claim 1, wherein the indicating of correspondence includes changing a visual characteristic of the second portion of the second document to differentiate the second portion of the second document from one or more other portions of the second document.

5. A method as described in claim 4, wherein the changing does not include altering a visual characteristic of the first document.

6. A method as described in claim 4, wherein the changing provides focus to the second portion of the second document.

7. A method as described in claim 1, wherein the user interface is configured to support translating of the second document to compose the first document.

8. A method as described in claim 1, further comprising saving the first document to include the indications of correspondence to the second document such that subsequent selection of a feature to initiate editing the first document causes the second document to be opened automatically and without user intervention.

9. In a digital medium environment for synchronized editing of simultaneously displayed first and second documents in a user interface, a method implemented by one or more computing devices comprising:

opening and displaying the first document and the second document simultaneously in the user interface;

outputting the first and second documents in the user interface that is configured to support editing of at least the first document;

receiving an input via the user interface to edit a first portion of the first document corresponding to a first portion of the second document;

subsequent to receiving the input to edit the first portion of the first document, receiving an input via the user interface to edit a next sequential portion of the first document relative to the first portion of the first document; and responsive to receiving the input to edit the next sequential portion of the first document, changing a visual characteristic of a next sequential portion of the second document relative to the first portion of the second document automatically and without user intervention in the user interface and forming a correspondence between the next sequential portion of the first document to the next sequential portion of the second document.

10. A method as described in claim 9, wherein the portions are paragraphs.

11. A method as described in claim 9, wherein the changing of the visual characteristic differentiates the next sequential portion from one or more other portions of the second document.

12. A method as described in claim 9, wherein the changing provides focus to the next sequential portion of the second document.

13. A method as described in claim 9, further comprising receiving one or more inputs from a user to alter the correspondence to a correspondence between the next sequential portion of the first document and another portion of the second document.

14. In a digital medium environment for synchronized editing of simultaneously displayed document portions in a user interface, a system comprising:
at least one module implemented at least partially in hardware, the at least one module configured to perform operations comprising:
outputting the user interface configured to support editing of a document to perform a translation of another document;
opening and displaying the document and the other document being translated in the user interface;
indicating correspondence between a portion of the document to a portion of the other document being translated and synchronizing the portion of the document and the portion of the other document being translated, the indicating and synchronizing occurring automatically and without user intervention; and
responsive to receiving an input via the user interface to edit a subsequent portion of the document, synchronizing the subsequent portion of the document with a subsequent portion of the other document being translated relative to the portion of the other document being translated and indicating correspondence in the user interface between the subsequent portion of the document and the subsequent portion of the other document being translated.

15. A system as described in claim 14, wherein the portions are paragraphs.

16. A system as described in claim 14, wherein the indications include changing a visual characteristic that differentiates the respective portions from one or more other portions of the second document.

17. A system as described in claim 14, wherein the indications provide focus to the respective portions of the second document.

18. A system as described in claim 14, further comprising receiving one or more inputs from a user to alter the correspondences between the respective portions of the first and second document to each other.

19. A system as described in claim 14, further comprising saving the first document to include the indications of correspondence to the second document such that subsequent selection of a feature to initiate editing the first document causes the second document to be opened automatically and without user intervention.

20. A method as described in claim 1, wherein the method further comprises synchronizing index information from the first document with index information from the second document.

* * * * *